(12) United States Patent  
Swengler (10) Patent No.: US 10,270,863 B1  
(45) Date of Patent: Apr. 23, 2019

(54) SYSTEM AND METHOD FOR INTERNET OF THINGS (IOT) DEVICE AUTHENTICATION AND SECURITY

(71) Applicant: Paul Stuart Swengler, Honolulu, HI (US)

(72) Inventor: Paul Stuart Swengler, Honolulu, HI (US)

( * ) Notice: Subject to any disclaimer, the term of this patent is extended or adjusted under 35 U.S.C. 154(b) by 0 days.

(21) Appl. No.: 16/209,032

(22) Filed: Dec. 4, 2018

Related U.S. Application Data (62) Division of application No. 15/943,690, filed on Apr. 2, 2018, now Pat. No. 10,178,187.

(51) Int. Cl.
*H04L 29/06* (2006.01)
*H04L 29/08* (2006.01)
*H04W 88/16* (2009.01)

(52) U.S. Cl.
CPC ........ *H04L 67/146* (2013.01); *H04L 63/0236* (2013.01); *H04L 63/0876* (2013.01); *H04L 63/20* (2013.01); *H04L 67/125* (2013.01); *H04W 88/16* (2013.01)

(58) Field of Classification Search
CPC ...... H04L 67/125; H04L 67/146; H04L 28/18
See application file for complete search history.

(56) References Cited

U.S. PATENT DOCUMENTS

| | | | |
|---|---|---|---|
| 7,260,638 B2* | 8/2007 | Crosbie | H04L 63/10 707/999.009 |
| 7,895,445 B1* | 2/2011 | Albanese | G06F 21/335 713/172 |
| 8,943,204 B2* | 1/2015 | Caldeira de Andrada | H04L 67/325 709/226 |
| 9,674,870 B1* | 6/2017 | Chaganti | H04L 45/60 |
| 2004/0152439 A1* | 8/2004 | Kimura | H04L 69/16 455/403 |
| 2011/0131338 A1* | 6/2011 | Hu | H04W 76/11 709/229 |
| 2017/0295088 A1* | 10/2017 | van der Kluit | H04L 45/1287 |
| 2018/0206107 A1* | 7/2018 | Koshimizu | H04W 8/20 |
| 2018/0270904 A1* | 9/2018 | Swengler | H04W 88/16 |

* cited by examiner

*Primary Examiner* — Raj Jain
(74) *Attorney, Agent, or Firm* — Law Office of Steven R. Olsen, PLLC; Steven R. Olsen (57) ABSTRACT

One or more IoT devices are coupled to a gateway server. The gateway server preferably includes enhanced administrative features for restricting access to IoT devices, and for monitoring IoT device communications. In embodiments of the invention, communications between the gateway server and IoT devices are secured, in part, via IP address restriction, the use of transitory identifiers, and/or encryption.

7 Claims, 12 Drawing Sheets

| USER(S) 805 | IOT DEVICE(S) 810 | COMMAND(S) 815 | TEMPORAL RESTRICTIONS 820 |
|---|---|---|---|
| ▸ GROUP<br>▸ SUB-GROUP<br>▸ INDIVIDUAL PERSON | ▸ DEVICE GROUP<br>▸ DEVICE SUB-GROUP<br>▸ SPECIFIC DEVICE | ▸ COMMAND GROUP(S)<br>▸ SELECTED COMMAND(S) | ▸ DATE(S)<br>▸ DAY(S) OF WEEK<br>▸ SHIFT(S)<br>▸ HOUR RANGE |

FIG. 8

| USER(S) 805 | IOT DEVICE(S) 810 | COMMAND(S) 815 | TEMPORAL RESTRICTIONS 820 |
|---|---|---|---|
| JOE SMITH | DEVICE GROUP 1 | COMMAND GROUP A | FIRST SHIFT |
| AUDIT TEAM C | DEVICE S/N 0002 | READ COMMAND | JANUARY 02, 2020<br>1:00 - 3:00 P.M. |

| DETECTION EXAMPLE 1505 | THREAT LEVEL ASSIGNMENT EXAMPLE 1510 | RESPONSE EXAMPLE 1515 |
|---|---|---|
| ROUTINE COMMUNICAITONS | VERY LOW | LOG ALL ACTIVITY |
| AUTHORIZED USER ATTEMPTING TO VIOLATE USER PERMISSIONS | LOW | LOG AND REPORT |
| ATTEMPTED ACCESS TO IOT DEVICE BY UNAUTHORIZED USER | MEDIUM | LOG, BLOCK, TRACE, AND REPORT |
| ATTEMPT AT SPOOFING SERVER OR IOT DEVICE | HIGH | LOG, SUSPEND COMMUNICATIONS, AND SOUND ALARM |

FIG. 15

SYSTEM AND METHOD FOR INTERNET OF THINGS (IOT) DEVICE AUTHENTICATION AND SECURITY

CROSS-REFERENCE TO RELATED APPLICATIONS

This application is a divisional of prior U.S. application Ser. No. 15/943,690 filed on Apr. 2, 2018.

BACKGROUND

Field of Invention

The invention relates generally to communication networks. More specifically, but not by way of limitation, embodiments of the invention provide improvements in authentication and other security features for communications with Internet of Things (IoT) devices.

Description of the Related Art

Internet of Things (IoT) devices are physical electronic devices, typically with a sensor or actuator, that are connected to a communication network. An IoT device may be stationary in use, for example in a home appliance or piece of manufacturing equipment. An IoT device can also be a mobile device, or used in a mobile device, for instance deployed in an automobile. A growing number of IoT device applications exist in consumer, industrial, energy, transportation, military, and other market segments.

Known IoT device applications generally have shortcomings related to risk of unauthorized access. One reason for this is that IoT devices are supplied by many different manufacturers, often targeting a narrow application space. As a result, IoT devices have diverse operating systems and configurations. Security standards for IoT devices are lacking. An improved system and method for secure IoT device communications that can be applied to a wide range of applications is urgently needed.

SUMMARY OF THE INVENTION

The invention seeks to overcome security risks associated with the use of IoT devices. In embodiments of the invention, one or more IoT devices are coupled to a gateway server. The gateway server preferably includes enhanced administrative features for restricting access to IoT devices, and for monitoring IoT device communications. In embodiments of the invention, communications between the gateway server and IoT devices are secured, in part, via IP address restriction, the use of transitory identifiers, and/or encryption.

DESCRIPTION OF THE DRAWINGS

An embodiment of the invention is illustrated in the drawings, wherein.

DETAILED DESCRIPTION

This section describes embodiments of the invention with reference to FIGS. 1-15. Such embodiments are meant to be illustrative and not restrictive. In the drawings, reference designators are reused for the same or similar features. Some features may be simplified, omitted, or not specifically referenced for descriptive clarity. Although sub-headings are used below for organizational convenience, disclosure of any particular feature is not necessarily limited to any section.

Functional Architecture

Figure 1:
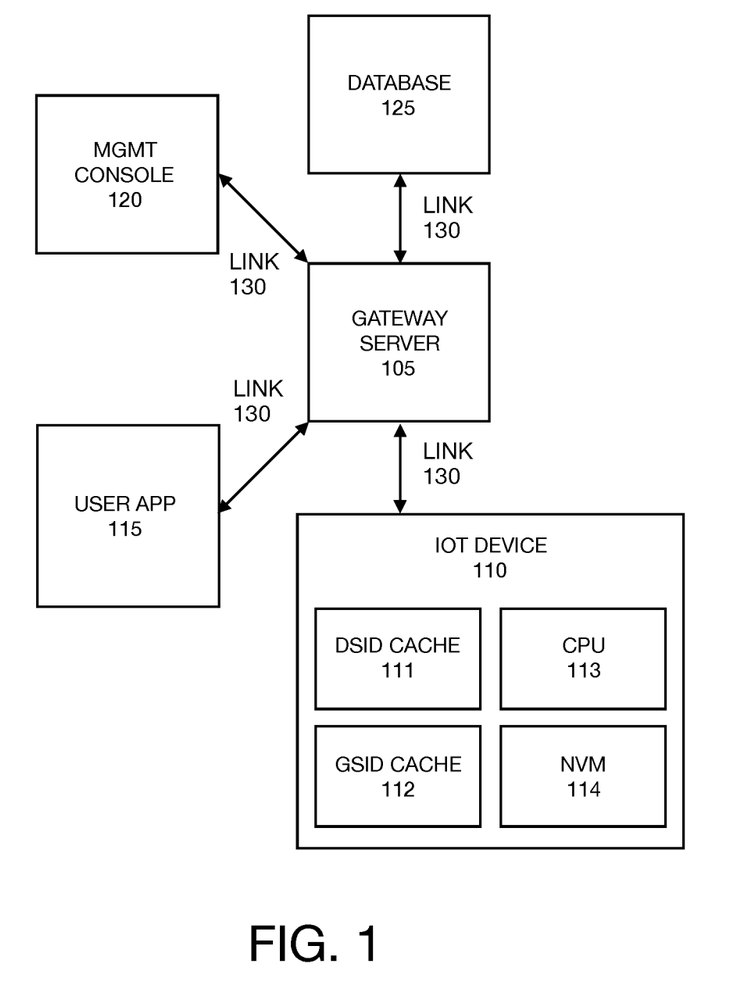
FIG. 1 is a functional block diagram of a networked system, according to an embodiment of the invention.

FIG. 1 is a functional block diagram of a networked system, according to an embodiment of the invention. As shown therein, a gateway server 105 is coupled to an IoT device 110, user application 115, management console 120, and database 125 via communication links 130. Each of the links 130 could be wired or wireless, and may be or include, for instance, the internet, a wide area network (WAN), and/or a local area network (LAN).

In the illustrated embodiment, the IoT device 110 includes device session identifier (DSID) cache 111, gateway session identifier (GSID) cache 112, central processing unit (CPU) 113, and non-volatile memory (NVM) 114. The purpose and function of DSID cache 111 and GSID cache 112 will be discussed further below. NVM 114 may store IoT device 110 firmware and data (such as factory settings 710).

User application 115 and/or management console 120 could each be, for example, a mobile or other remote device with browser or other client software adapted to cooperate with the gateway server 105. In use, user application 115 may provide user access to IoT device 110 according to pre-determined permissions. Management console 120 may facilitate administrative functions such as setting IoT device 110 parameters, setting user permissions, defining monitoring policy, and reviewing system status. Database 125 could be used to store, for example, administrative data and/or sensor data from the IoT device 110.

Variations to the functional architecture illustrated in FIG. 1 are possible. For instance, the illustrated components could be coupled using different methods, rather than a uniform link 130. In typical deployments, there would be multiple IoT devices 110, user applications 115, and management consoles 120 coupled to a gateway server 105. In addition, a single IoT device 110 may be configured to couple to more than one gateway server 105 (e.g., in the alternative). One embodiment described below does not require GSID cache 112.

Figure 2:
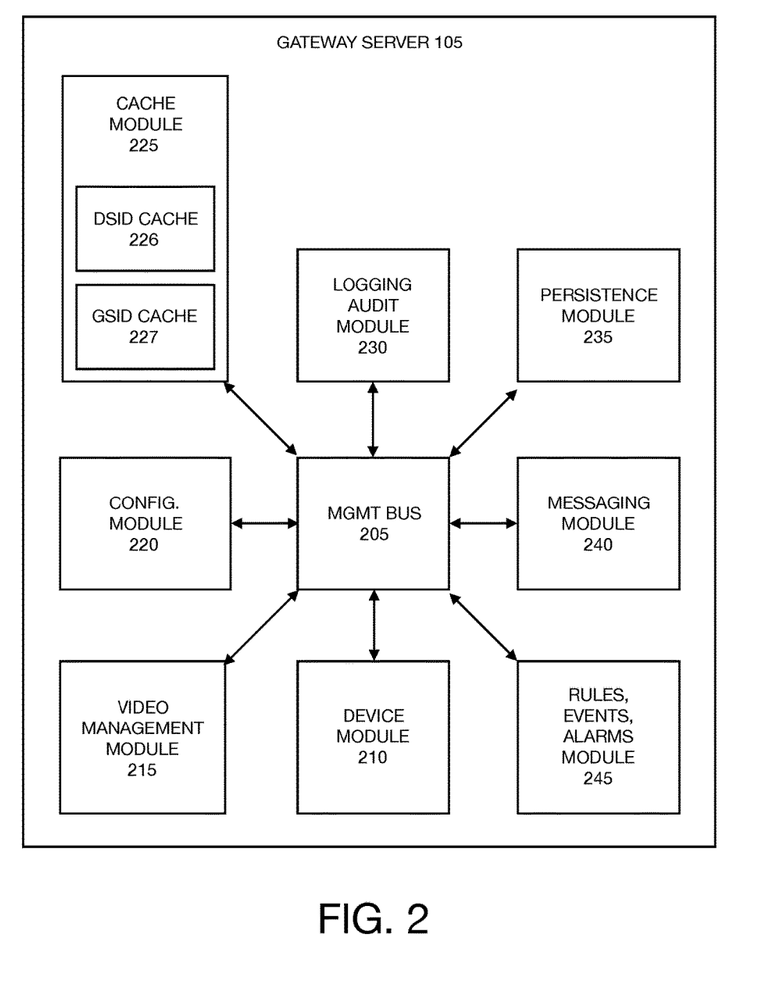
FIG. 2 is a functional block diagram of a gateway server, according to an embodiment of the invention.

FIG. 2 is a functional block diagram of a gateway server, according to an embodiment of the invention. As illustrated, a device module 210, video management module 215, configuration module 220, cache module 225, logging audit module 230, persistence module 235, messaging module 240, rules/events/alarms module 240 are connected via a management bus 205.

In the illustrated embodiment, device module 210 provides an interface to IoT device 110. Video management module 215 may be used, for instance, to manage the collection or playback of video received from the IoT device 110. The configuration module 220 allows an IoT device 110 owner or other administrator to manage certain IoT device 110 parameters (e.g., deployment settings 715). Cache module 225 manages certain cache operations for the gateway server 105; the purpose and function of DSID cache 226 and GSID cache 227 are discussed below. Rules/events/alarms module 245 and logging audit module 230 facilitate management of monitoring policy and execution, respectively. Persistence module 235 is a management tool to facilitate persistent data storage, for instance in the database 125. Messaging module 240 facilitates messaging from the gateway server 105 to a user or owner (or other administrators), for example in the case of an actual or attempted security breach. Not all above-described components are required in all deployments of a gateway server 105.

Top Level Flow

Figure 3:
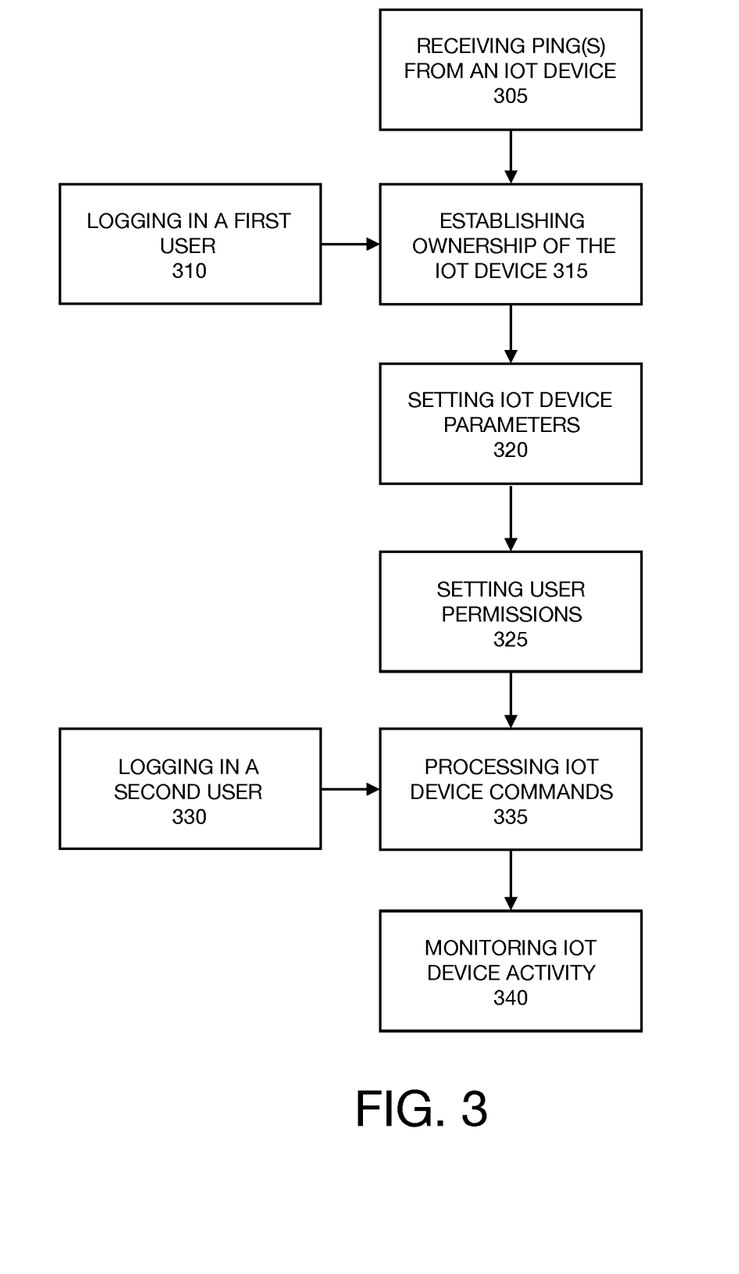
FIG. 3 is a flow diagram of a gateway server process, according to an embodiment of the invention.

FIG. 3 is a flow diagram of a gateway server process, according to an embodiment of the invention. All process steps illustrated in FIG. 3 and discussed below may be performed by the gateway server 105.

As shown in FIG. 3, the process begins by receiving one or more pings from an IoT device 110 in step 305. Ping may be received in step 305, for instance, upon power-up of a new IoT device 110. The purpose of receiving step 305 is to facilitate discovery of the IoT device 110 by the gateway server 105. As used herein, a ping includes a data transmission, for instance a packet, from the IoT device 110 to the gateway server 105; a reply transmission from the gateway 105 to the IoT device 110 may not be required. Pings in step 305 may be received in the gateway server 105, for example, at a time interval that is determined by the IoT device 110, and such pings preferably include a serial number (S/N) and internet protocol (IP) address for the IoT device 110. Additional data items could be included in the step 305 ping according to design choice.

The process logs in a first user in step 310, and establishes the first user as an initial owner (top administrator) of the IoT device 110 in step 315. One alternative process for executing step 315 is presented below with reference to FIGS. 4 and 5; another is described with reference to FIG. 6. Once established, the owner can set IoT device 110 parameters in step 320 and/or set user permissions in step 325. IoT device 110 parameters are described below with reference to FIG. 7; user permissions are described with reference to FIGS. 8 and 9.

The process logs in a second user in step 330. The process securely relays commands from the owner or second user through the gateway 105 to the IoT device 110 in step 335 (for the second user, processing in step 335 is conditional on user permissions set in step 325). One embodiment of step 335 is presented below with reference to FIGS. 10-12; a second embodiment of step 335 is described with reference to FIG. 13. All system communications are preferably monitored in step 340. An embodiment of step 340 is described below with reference to FIGS. 14 and 15.

Variations to the process illustrated in FIG. 3 and described above are possible. For instance, in a controlled and static environment (i.e., one with fixed IP addresses), receiving step 305 may not be required. Steps 320 and/or 325 may not be required in embodiments where default IoT device 110 parameters and/or user permissions are provided by the system. In addition, in certain applications, the owner established in step 315 may be the only user of the IoT device 110, without necessity for logging in a second user in step 330.

Establishing Ownership of an IoT Device

Figure 4:
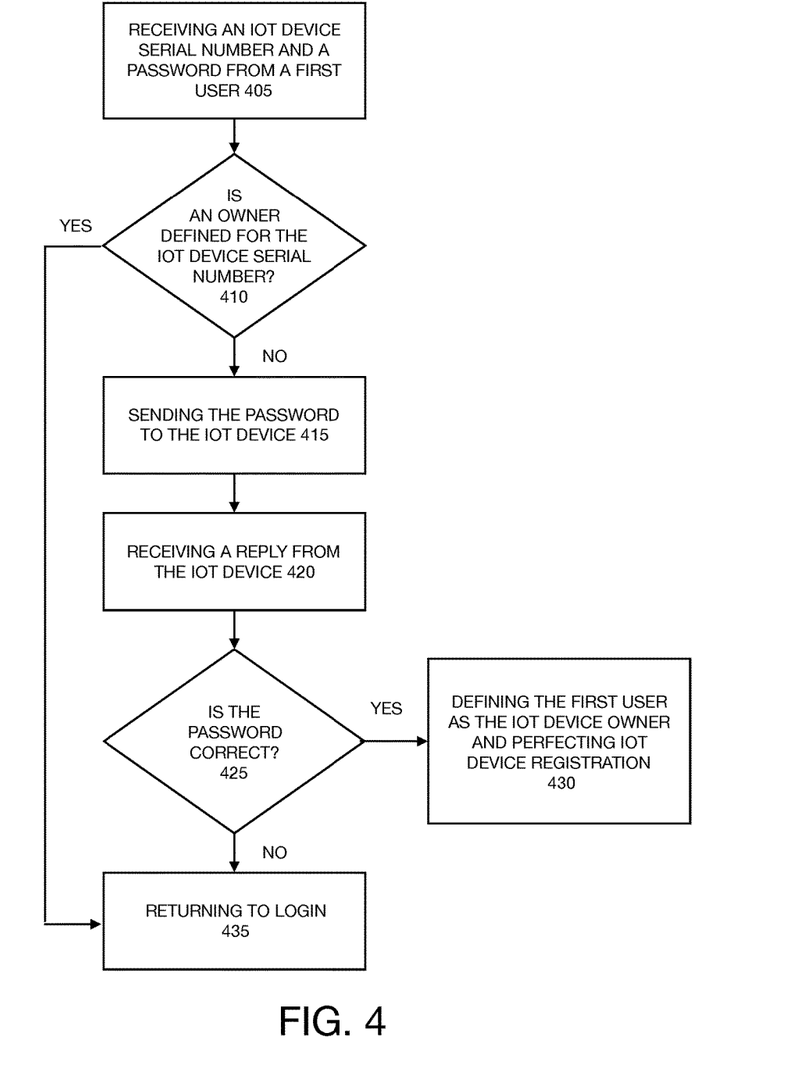
FIG. 4 is a flow diagram of a process for establishing initial ownership of an IoT device, according to an embodiment of the invention.

A first owner is a top-level administrator. Any subsequent owners and users derive authority from the first owner (for instance in step 325). FIG. 4 is a flow diagram of a process for establishing initial ownership of an IoT device, according to an embodiment of the invention. The process illustrated in FIG. 4 may be performed by the gateway server 105. As shown therein, the process begins by receiving an IoT device 110 serial number (S/N) and password from a first user in step 405.

In conditional step 410, the process determines whether an owner (administrator) has already been defined for the IoT device 110 S/N. If an owner has not yet been assigned, the process sends the password supplied by the first user to the IoT device 110 in step 415, and receives a reply (i.e., in the form of a validation or rejection) from the IoT device 110 in step 420. Conditional step 425 directs further processing based on the reply. If the password is validated, then the process defines (or establishes) the first user as the IoT device 110 owner in step 430. Step 430 also perfects registration of the IoT device 110, making the IoT device 110 a part of the network topology.

If the process determines an owner has already been established for the IoT device 110 S/N in step 410, or if the password supplied by the first user is not validated by the IoT device 110, then the process returns the first user to a login process in step 435. The process described with reference to FIG. 4 does not require the gateway server 105 to store or compare IoT device 110 passwords.

Figure 5:
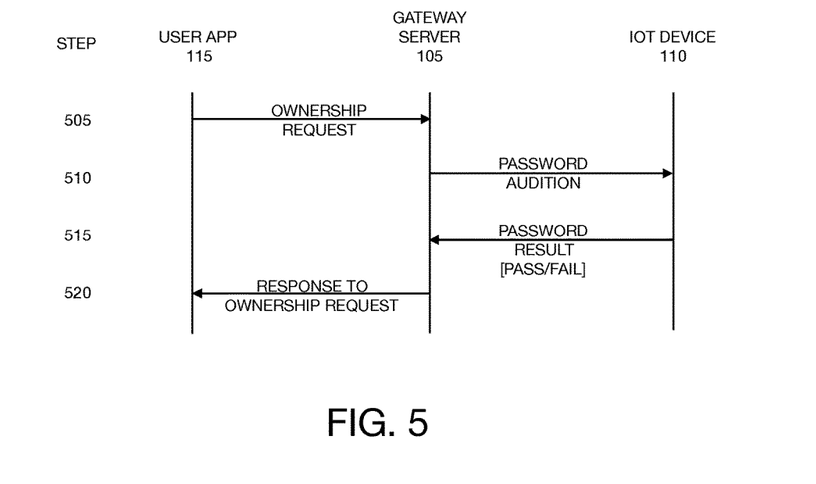
FIG. 5 is a communication diagram for the process illustrated in FIG. 4.

FIG. 5 is a communication diagram for the process illustrated in FIG. 4. As shown therein, an ownership request is sent from the user app 115 to the gateway server 105 in step 505, a password audition is sent from the gateway server 105 to the IoT device 110 in step 510, a password result is sent from the IoT device 110 to the gateway server 105 in step 515, and a response to the ownership request is sent from the gateway server 105 to the user app 115 in step 520.

Figure 6:
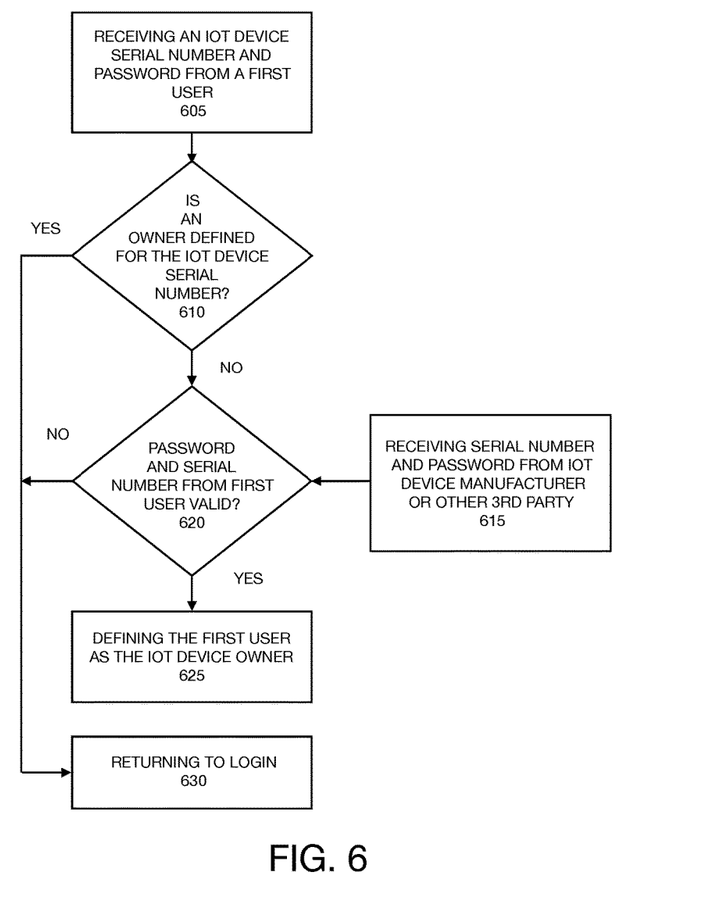
FIG. 6 is a flow diagram of a process for establishing ownership of an IoT device, according to an embodiment of the invention.

FIG. 6 is a flow diagram of a process for establishing initial ownership of an IoT device, according to an embodiment of the invention. The illustrated process is performed in the gateway server 105. A distinguishing feature for the process in FIG. 6 is that at some point prior to step 620, the process receives a serial number and associated password for an IoT device 110, for instance from a manufacturer or other 3rd party, in step 615.

The process receives an IoT device 110 S/N and password from a first user in step 605. In conditional step 610, the process determines whether an owner (administrator) has already been defined for the IoT device 110 S/N. If an owner has not yet been assigned, the process advances to conditional step 620 to determine whether the password supplied by the first user matches the password supplied for that same IoT device S/N in step 615. If the gateway server 105 validates the password supplied by the first user, then the process establishes the first user as the owner in step 625.

If the process determines an owner has already been established for the IoT device 110 S/N in step 610, or if the password supplied by the first user is not validated by the gateway server 110 in step 620, then the process returns the first user to a login process in step 630.

Setting IoT Device Parameters and User Permissions

Figure 7:
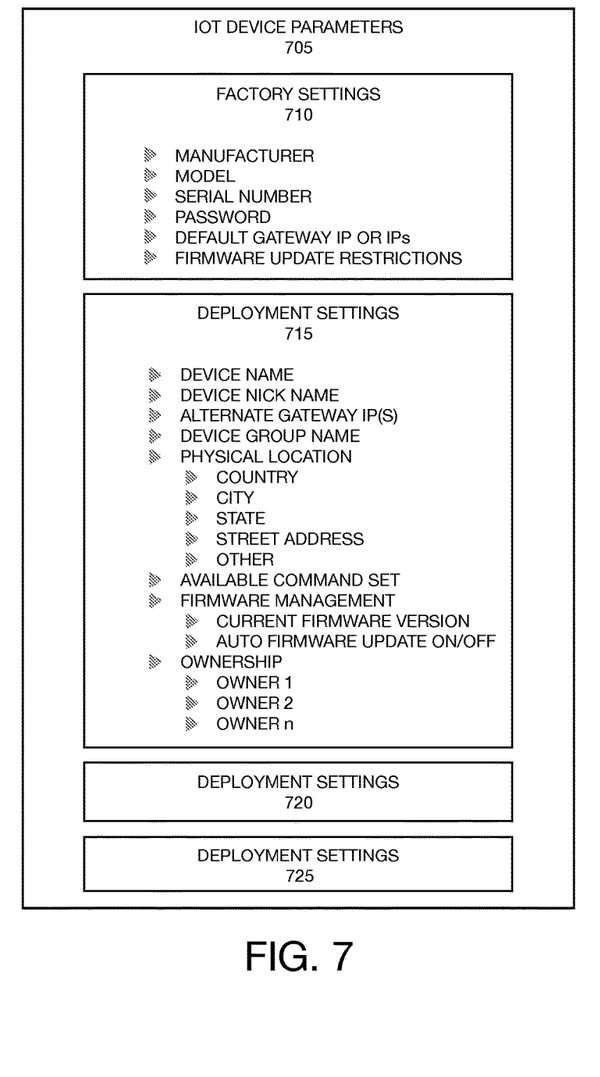
FIG. 7 is an illustration of an IoT device parameter table, according to an embodiment of the invention.

FIG. 7 is an illustration of an IoT device parameter table 705, according to an embodiment of the invention. Factory settings 710 may be stored in NVM 114 of the IoT device 110 and, in embodiments of the invention, may not be changed by an owner. On the other hand, parameters listed in deployment settings table 715 are representative of the types of parameters an IoT device 110 owner could add, delete, or change, for instance in step 320, and according to application needs. In embodiments of the invention, deployment settings 715 may be stored in, or managed by, for example, the configuration module 220 and/or the rules/events/alarms module 245.

In embodiments of the invention, deployment settings table 715 is representative of a graphical user interface (GUI) an owner uses to view and set IoT device parameters at management console 120.

Deployment settings tables 720 and 725 could be configured with the same or similar parameters as listed in deployment settings table 715. The possibility of multiple deployment settings tables 715, 720, 725, illustrates that a unique set of device parameters can be set for each of multiple deployments.

Figure 8:
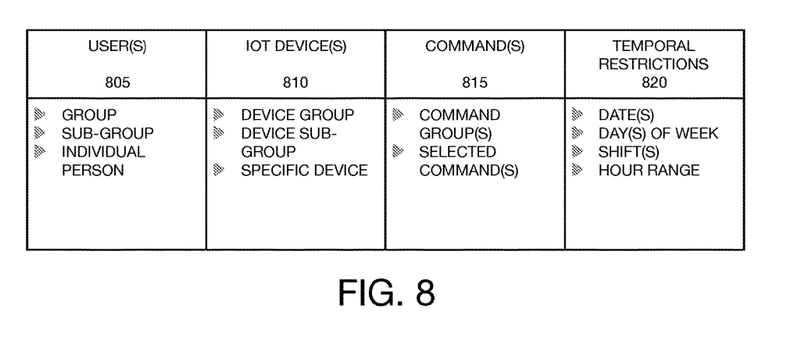
FIG. 8 is an illustration of IoT device user permission table, according to an embodiment of the invention.

FIG. 8 is an illustration of IoT device user permission table, according to an embodiment of the invention. In the illustrated embodiment, permissions can be defined according to user(s) based on options listed in column 805, IoT device(s) based on options listed in column 810, command(s) based on options listed in column 815, and temporal restrictions based on options listed in column 820.

Figure 9:
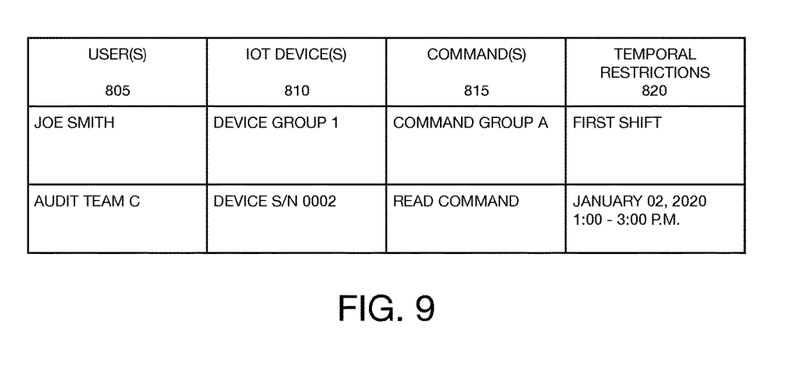
FIG. 9 is an illustration of IoT device user permission table, according to an embodiment of the invention.

FIG. 9 illustrates example user permissions consistent with available options presented in FIG. 8. Joe Smith (an individual person) has been given permission to access device group 1 (a device group) using command group A (a command group) during first shift (a selected shift). Audit Team C (a group of users) has been given permission to access device S/N 0002 (a specific device) using a read command (a selected command) on Jan. 2, 2020 between 1:00 p.m. and 3:00 p.m. (date and hour range restrictions).

In embodiments of the invention, the user permission tables presented in FIGS. 8 and 9 are representative of a graphical user interface (GUI) an owner uses to view and set user permissions at management console 120. In embodiments of the invention, IoT device 110 user permissions may be stored in the database 125.

Network Communications

A first embodiment for command processing is presented with reference to FIGS. 10-12, and a second embodiment for command processing is discussed with reference to FIG. 13.

Figure 10:
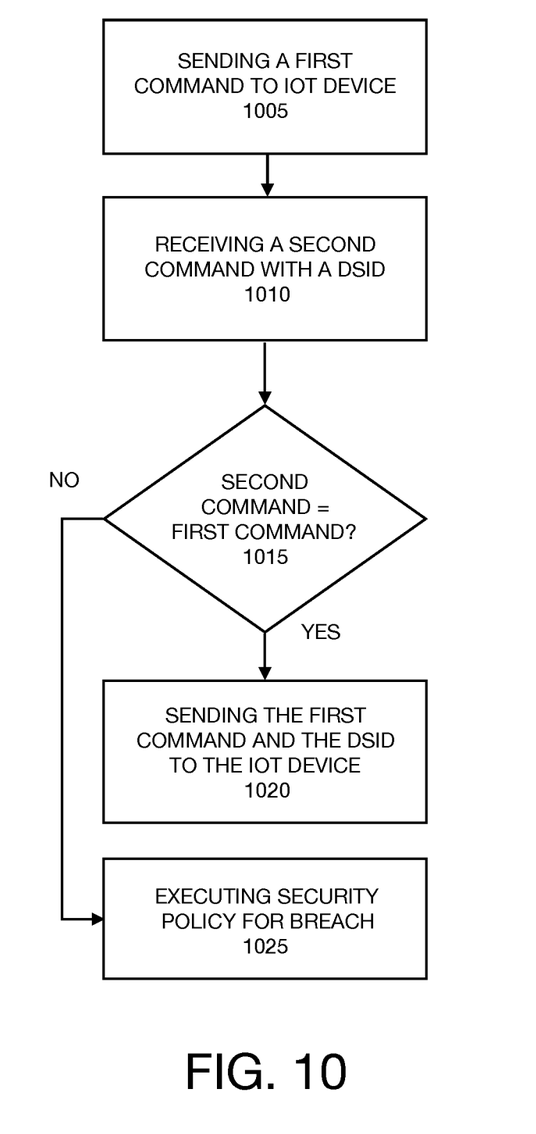
FIG. 10 is a flow diagram of a communication session from the perspective of a gateway server, according to an embodiment of the invention.

FIG. 10 is a flow diagram of a communication session from the perspective of a gateway server, according to an embodiment of the invention. The process begins by sending a first command to the IoT device 110 in step 1005. The gateway server 105 then receives a second command and a device session identifier (DSID) in step 1010.

As used herein, a session is an exchange of messages associated with transfer of a single command or data package between the gateway server 105 and the IoT device 110. A DSID is a transient identifier for the IoT device 110 that changes with each session.

In conditional step 1015, the process determines whether the second command is the same as the first command. If so, the process re-sends the first command and the DSID to the IoT device 110 in step 1020; if not, the process terminates by executing a security policy for a breach in step 1025. In the case of uninterrupted communications between the gateway server 105 and the IoT device 110, the conditions of step 1015 are satisfied, and the session completes with successful transmission of the first command from the gateway server 105 to the IoT device 110.

Figure 11:
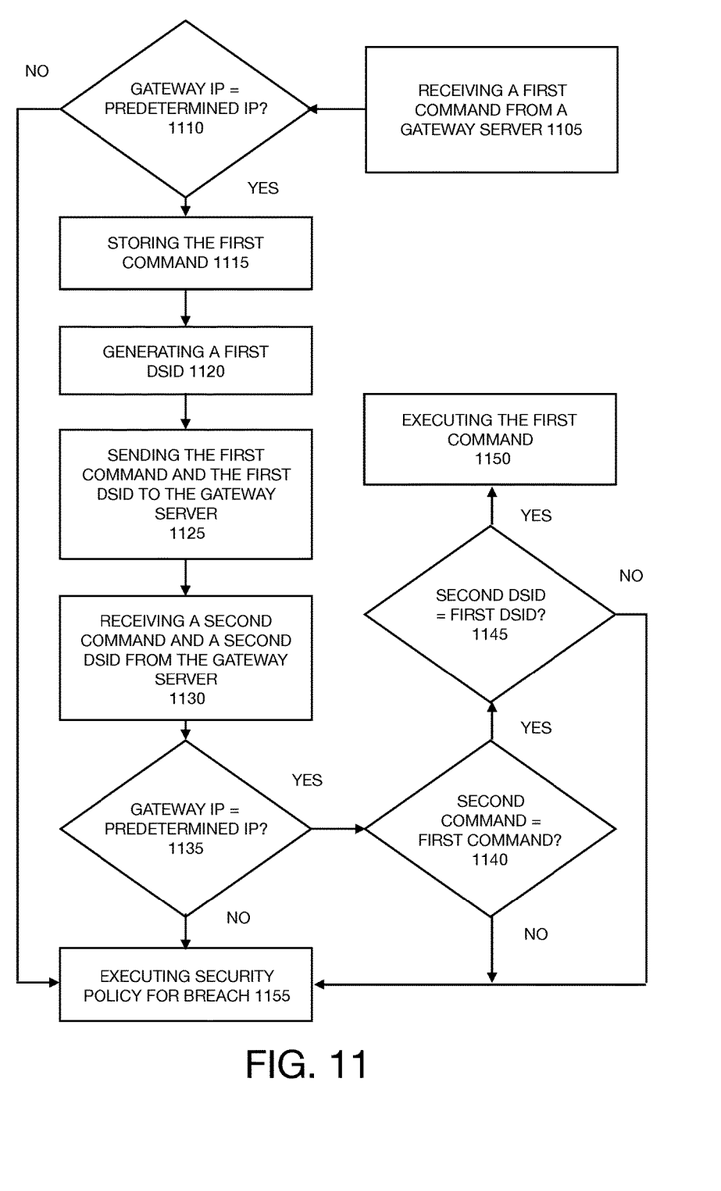
FIG. 11 is a flow diagram of a communication session from the perspective of an IoT device, according to an embodiment of the invention.

FIG. 11 is a flow diagram of a communication session from the perspective of an IoT device, according to an embodiment of the invention. The process begins by receiving a first command from a gateway server 105 in step 1105. In conditional step 1110, the process determines whether a gateway IP address associated with the first command is the same as a predetermined gateway IP address. If so, the process stores the first command in step 1115, generates a first DSID in step 1120, and sends the first command and the first DS ID to the gateway server 105 in step 1125.

The process then receives a second command and a second DSID from the gateway server in step 1130. In conditional steps 1135, 1140, and 1145, the process tests whether a gateway IP address associated with the second command and the second DSID is the same as the predetermined gateway IP address, whether the second command is the same as the first command, and whether the second DSID is the same as the first DSID.

If the conditions in steps 1135, 1140, and 1145 are satisfied, then the first command has been authenticated, and the process executes the first command in step 1150. If any of conditional steps 1110, 1135, 1140, or 1145 are not satisfied, then authentication has failed, and the process terminates by executing a security policy for breach in step 1155.

Figure 12:
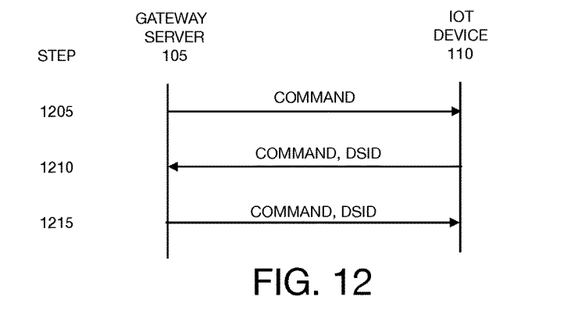
FIG. 12 is a communication sequence diagram for the processes illustrated in FIGS. 10 and 11, according to an embodiment of the invention.

FIG. 12 is a communication sequence diagram for the processes illustrated in FIGS. 10 and 11, according to an embodiment of the invention. FIG. 12 is a simplified view in that it only illustrates successful exchanges between the gateway server 105 and the IoT device 110, without illustrating any of the data comparisons or possible terminations in FIGS. 10 and 11. Accordingly, FIG. 12 shows that a command is sent from the gateway server 105 to the IoT device 110 in step 1205; the IoT device 110 sends the command and a DSID to the gateway server 105 in step 1210; and the gateway server 1215 sends the command and the DSID to the IoT device 110 in step 1215.

Figure 13:
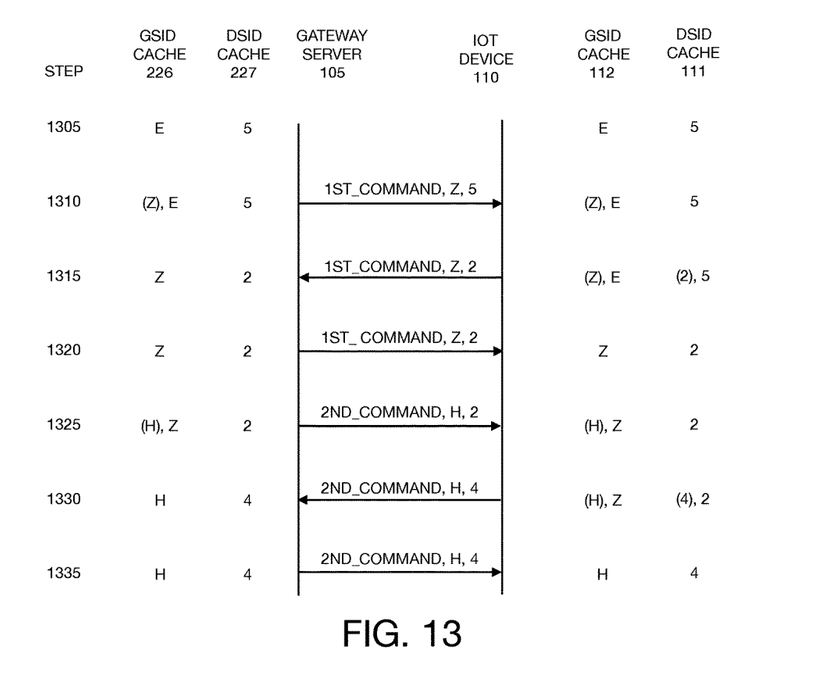
FIG. 13 is a communication sequence and cache status diagram for two communication sessions between a gateway server and an IoT device, according to an embodiment of the invention.

FIG. 13 is a communication sequence and cache status diagram for two communication sessions between a gateway server 105 and an IoT device 110, according to an embodiment of the invention. A first communication session is associated with delivery of 1st_command from the gateway server 105 to the IoT device 110, and includes steps 1310, 1315, and 1320. A second session is associated with delivery of 2nd_command from the gateway server 105 to the IoT device 110, and includes steps 1325, 1330, and 1335.

DSID was introduced above with reference to FIG. 10. The process illustrated in FIG. 13 also uses a GSID. A GSID is a transient identifier for the gateway server 105, and, like the DSID, changes with each session. According to the authentication scheme in FIG. 13 (and as illustrated in FIG. 2), the gateway server 105 includes a GSID cache 226 and a DSID cache 227. According to the authentication scheme in FIG. 13 (and as illustrated in FIG. 1), the IoT device 110 includes GSID cache 112 and DSID cache 111.

Step 1305 illustrates that, prior to the first communication session, the content of GSID cache 226 is "E", the content of DSID cache 227 is "5", the content of GSID cache 112 is "E", and the content of DSID cache 111 is "5".

To begin the first session, the gateway server 105 generates a new GSID "Z" in step 1310. The GSID cache 226 is represented as "(Z), E" in FIG. 13 because the new GSID "Z" is considered provisional in the GSID cache 226, and the prior GSID "E" is retained in the GSID cache 226, until the new GSID "Z" is returned by the IoT device 110. The gateway server 105 sends "1 st_command" (subject of the first session), along with new GSID "Z", and last used DSID "5", to the IoT device 110. The IoT device 110 updates GSID cache 112 to "(Z), E". The IoT device 110 considers GSID "Z" to be provisional until it is received a second time.

In step 1315, the IoT device 110 generates a new DSID "2". DSID cache 111 is represented as "(2), 5" because the new DSID "2" is considered provisional in the DSID cache 111, and prior DSID "5" is retained in the DSID cache 111, until the new DSID "2" is received from the gateway server 105. The IoT device 110 sends "1 st_command", along with GSID "Z" and DSID "2" to the gateway server 105. Upon receipt, the gateway server 105 stores "2" in DSID cache 227, and converts "Z" to a non-provisional status in GSID cache 226.

In step 1320, the gateway server 105 sends "1 st_command", GSID "Z", and DSID "2" to the IoT device 110. Upon receipt, the IoT device 110 converts GSID "Z" to non-provisional status in GSID cache 112, converts DSID "2" to non-provisional status in DSID cache 111, and execute the 1st_command.

The process described above for the first session (with reference to steps 1310, 1315, and 1320) is repeated for the second session (in steps 1325, 1330, and 1335). The transitory nature of the GSID and DSID enhance authentication and security. The use of provisional statuses for newly-generated GSID and DSID's facilitates recovery of communications between the gateway server 105 and the IoT device 110 if normal communications are interrupted.

In preferred embodiments of the invention, each single alpha character and single digit number used to represent GSID and DSID values in FIG. 13, respectively, is replaced by a string of alphanumeric characters.

In embodiments of the invention, the process illustrated in FIG. 13 preferably includes command comparison steps similar to steps 1015 and 1140. For instance, with respect to the first session, the gateway server 105 preferably verifies that the 1st_command it receives in step 1315 is identical to the 1st_command it sent in step 1310 as a condition for sending the 1st_command in step 1320. Likewise, the IoT device 110 preferably verifies that the 1st_command it received in step 1310 is identical to the 1st_command it received in step 1320 as a condition for executing the 1st_command.

In embodiments of the invention, the process illustrated in FIG. 13 preferably includes gateway IP address comparison steps similar to steps 1110 and 1135. For instance, with respect to the first session, the IoT device 110 preferably verifies that IP addresses associated with communications received in steps 1310 and 1320 match a predetermined (whitelisted) IP address.

Monitoring

Figure 14:
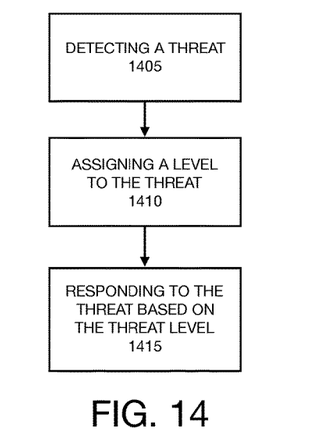
FIG. 14 is a flow diagram of a network communication monitoring process, according to an embodiment of the invention.

FIG. 14 is a flow diagram of a network communication monitoring process, according to an embodiment of the invention. As shown therein, the process includes detecting a threat in step 1405, assigning a level to the threat in step 1410, and responding to the threat based on the threat level in step 1415. In executing the process in FIG. 14, the logging audit module 230 applies policy specified in the rules/events/alarms module 245.

Figure 15:
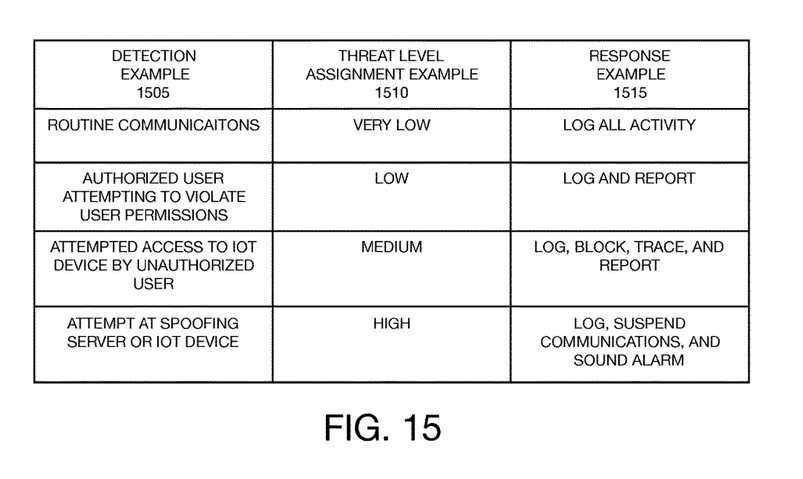
FIG. 15 is an illustration of a network communication monitoring policy table, according to an embodiment of the invention.

FIG. 15 is an illustration of a network communication monitoring policy table, according to an embodiment of the invention. In one respect, the table in FIG. 15 provides an example of how each detection example in column 1505 can be associated with a threat level in column 1510 and a response in column 12515. In another respect, the table illustrated in FIG. 15 could be representative of a GUI for an owner setting monitoring policy at management console 120.

Summary

Embodiments of the invention thus provide a system and method for IoT device authentication and security. Those skilled in the art can readily recognize that numerous variations and substitutions may be made in the invention, its use and its configuration to achieve substantially the same results as achieved by the embodiments described herein. Features disclosed in this specification could be combined in ways not expressly illustrated or discussed. Accordingly, there is no intention to limit the invention to the disclosed exemplary forms and applications. Many variations, modifications and alternative constructions fall within the scope and spirit of the disclosed invention.

I claim:

1. A communication system comprising:
   a gateway server; and
   an internet of things (IoT) device coupled to the gateway server, the gateway server being configured to perform a first method, the first method including:
      sending a first command to the IoT device;
      receiving a second command and a device session identifier (DSID) from the IoT device, the DSID being a transient identifier that changes with each communication session between the gateway server and the IoT device; and
      selectively sending the first command and the DSID to the IoT device.

2. The communication system of claim 1, wherein:
   if the second command is identical to the first command, the step of selectively sending including sending the first command and the DSID to the IoT device; and
   if the second command is not identical to the first command, the step of selectively sending not including sending the first command and the DSID to the IoT device.

3. The communication system of claim 1, the IoT device being configured to perform a second method, the second method including:
   receiving the first command;
   determining whether the first command was received from a predetermined gateway IP address; and
   if the first command was received from the predetermined gateway IP address, generating the DSID, and sending the second command and the DSID to the gateway server, the second command being identical to the first command.

4. The communication system of claim 1, the IoT device being configured to perform a second method, the second method including:
- receiving the first command;
- generating the DSID;
- sending the second command and the DSID to the gateway server, the second command being identical to the first command;
- receiving the first command and the DSID;
- determining whether the sent DSID and the received DSID are identical; and
- if the sent DSID and the received DSID are identical, executing the first command.

5. The communication system of claim 1, the first method further including:
- in the gateway server, receiving an IoT device serial number and an IoT device password from a user; and
- establishing the user's ownership of the IoT device, the ownership being associated with permissions for the user on the communication system.

6. The communication system of claim 5, wherein establishing the user's ownership of the IoT device includes:
- sending the password from the gateway server to the IoT device, the IoT device being associated with the IoT device serial number;
- receiving the password in the IoT device;
- In the IoT device, comparing the password to a stored password and sending a reply to the gateway server, the reply being one of a validation message and a rejection message;
- in the gateway server, receiving the reply from the IoT device; and
- in the gateway server, if the reply is the validation message, assigning the user as the IoT device owner.

7. The communication system of claim 5, wherein establishing the user's ownership of the IoT device includes:
- in the gateway server, receiving a record, the record having a plurality of IoT device serial numbers and a plurality of passwords, each of the plurality of IoT device serial numbers having at least one associated password from the plurality of passwords;
- in the gateway server, determining whether the password is valid for the IoT device, the determining based on the record; and
- in the gateway server, if the password is valid, assigning the user as the IoT device owner.

* * * * *